Feb. 17, 1953  E. W. MILLER  2,628,538
GEAR GENERATING MACHINE WITH RACK TYPE CUTTER
Filed June 21, 1946  12 Sheets-Sheet 1

INVENTOR
Edward W. Miller
BY
ATTORNEYS

Feb. 17, 1953  E. W. MILLER  2,628,538
GEAR GENERATING MACHINE WITH RACK TYPE CUTTER
Filed June 21, 1946  12 Sheets-Sheet 2
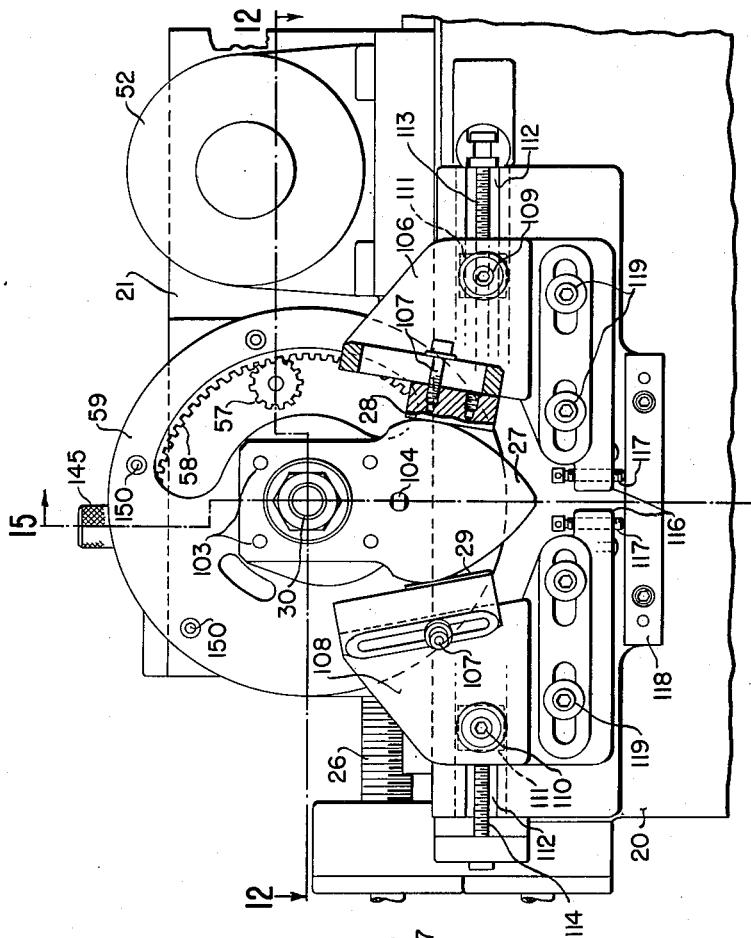
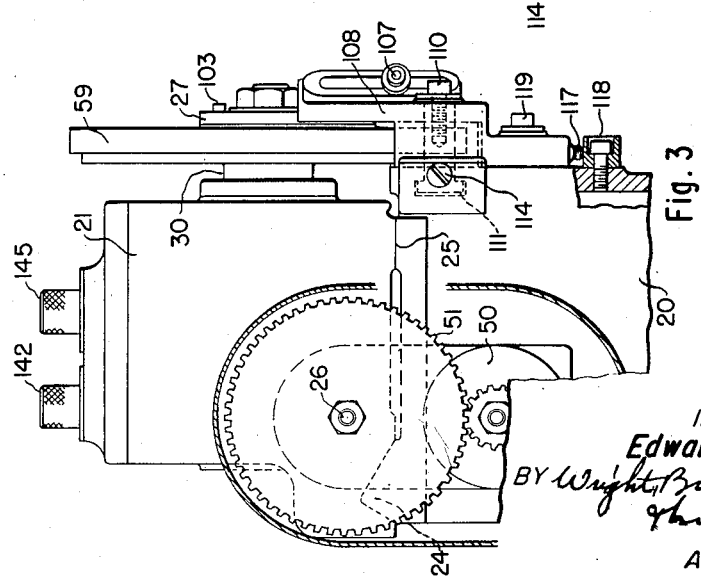
INVENTOR
Edward W. Miller
BY Wright, Brown, Quinby
Thay
ATTORNEYS

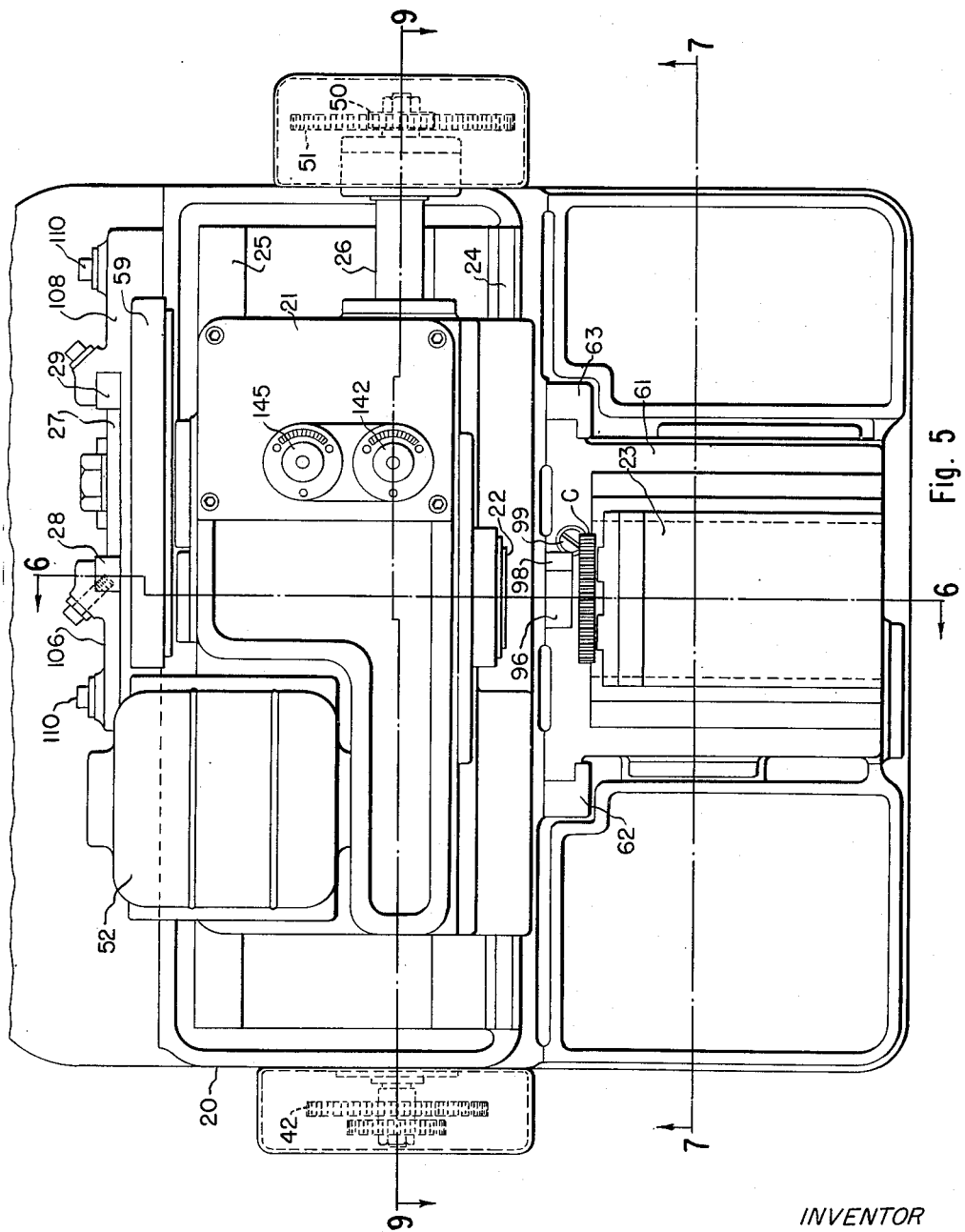

Feb. 17, 1953 — E. W. MILLER — 2,628,538
GEAR GENERATING MACHINE WITH RACK TYPE CUTTER
Filed June 21, 1946 — 12 Sheets-Sheet 6

INVENTOR
Edward W. Miller
BY
ATTORNEYS

Feb. 17, 1953  E. W. MILLER  2,628,538
GEAR GENERATING MACHINE WITH RACK TYPE CUTTER
Filed June 21, 1946  12 Sheets-Sheet 8

INVENTOR
Edward W. Miller
BY Wright, Brown, Quimby & May
ATTORNEYS

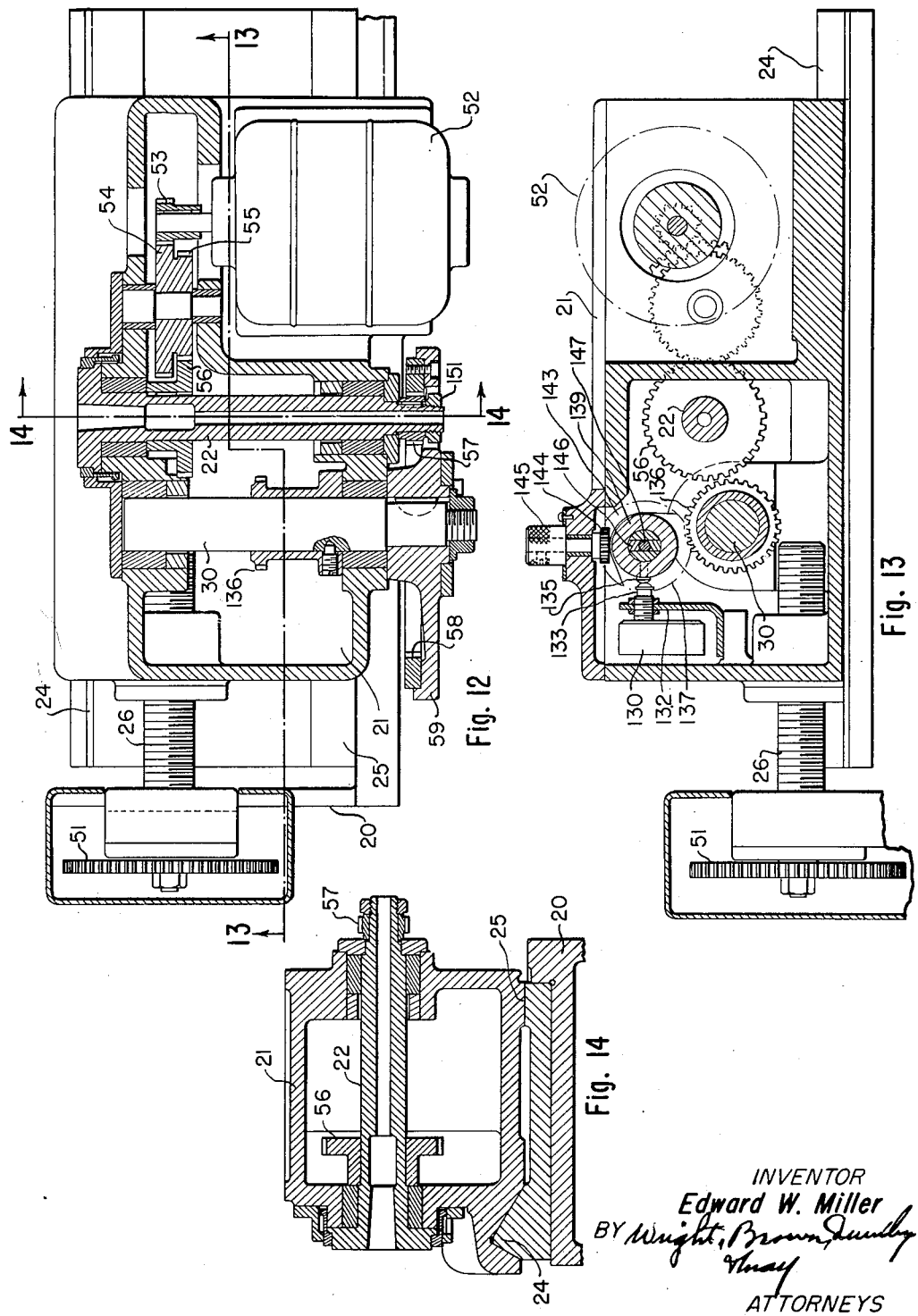

Feb. 17, 1953     E. W. MILLER     2,628,538
GEAR GENERATING MACHINE WITH RACK TYPE CUTTER
Filed June 21, 1946     12 Sheets-Sheet 11
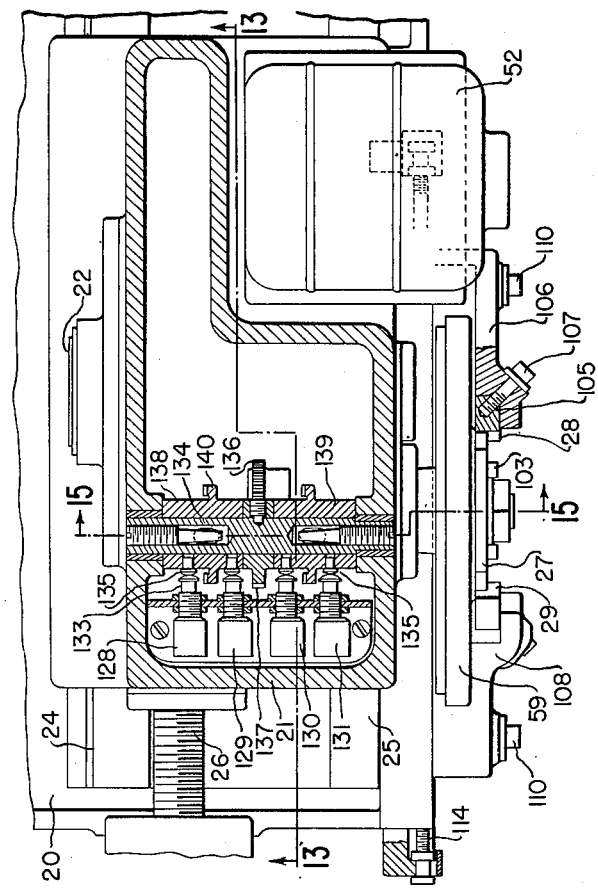
INVENTOR
Edward W. Miller
BY Wright, Brown, Quimby & May
ATTORNEYS Patented Feb. 17, 1953

2,628,538

UNITED STATES PATENT OFFICE 2,628,538

GEAR GENERATING MACHINE WITH RACK TYPE CUTTER

Edward W. Miller, Springfield, Vt., assignor to The Fellows Gear Shaper Company, Springfield, Vt., a corporation of Vermont Application June 21, 1946, Serial No. 678,477

17 Claims. (Cl. 90—8)

The present invention relates to machines for cutting gears according to the so called molding generating process, in which the cutter has teeth arranged in a straight row like those of a rack with cutting edges at one end of each tooth and clearance at the sides. It is especially useful for generating small gears and pinions of fine pitches with great accuracy, although its principles are not limited in respect to dimensions and pitches of the work produced.

In my Patent No. 2,372,596, dated March 27, 1945, I have disclosed embodiments of machines for generating gears by means of rack type cutters in which the cutter is given a progressive travel lengthwise while being reciprocated transversely of its length for cutting, and the work is rotated in harmony with the translative progress of the cutter. The object of the present invention is to accomplish results equal or superior to those obtained by the machines of prior inventions and to do so by simplified mechanism in which the work is rolled along the cutter with translative and rotative components of motion, and the rotative component is controlled by a former and comprehends a complete rotation or a plurality of rotations. Included within this object is that of completely rotating the work one or more times while controlling its rate of rotation with entire accuracy by means of a former oscillating through a minor fraction of a rotation under the control of associated abutments. Other objects are concerned with novel means for supporting, operating and adjusting the cutter, backing off the cutter when making its return or non cutting strokes, and regulating the length of the translative movements of the work holder.

The manner in which these objects are accomplished and the particulars in which the invention consists can best be explained in connection with the description of an illustrative concrete embodiment. Such a description follows with reference to drawings, in which—

Fig. 3 is an enlarged view portion of Fig. 2;

Fig. 4 is a rear view of the upper part of the machine on a scale larger than that of Figs. 1 and 2;

Fig. 5 is a plan view of the machine;

Figure 2:
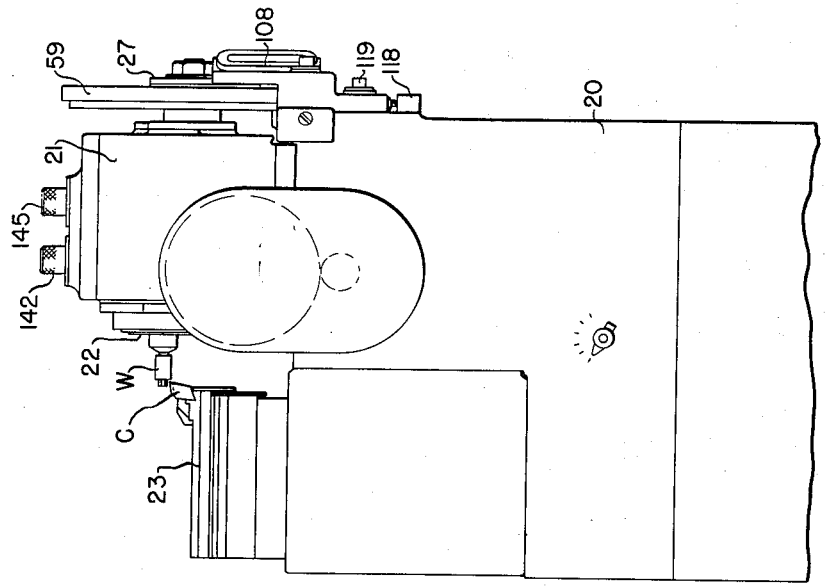
Fig. 2 is a side elevation of the machine as seen from the right of Fig. 1.
Figure 1:
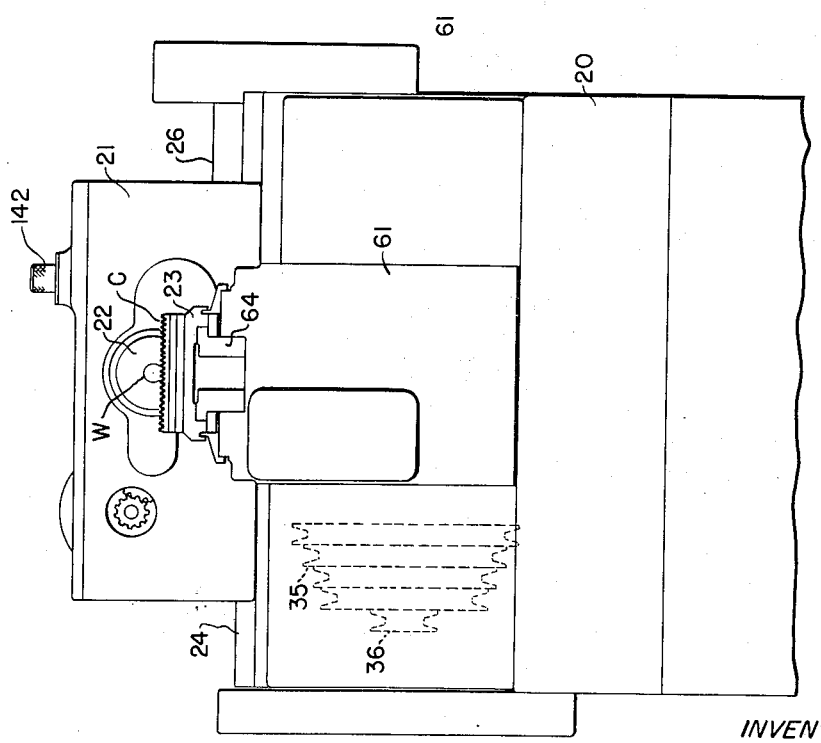
Fig. 1 is a front elevation of a machine embodying the invention.
Figure 6:
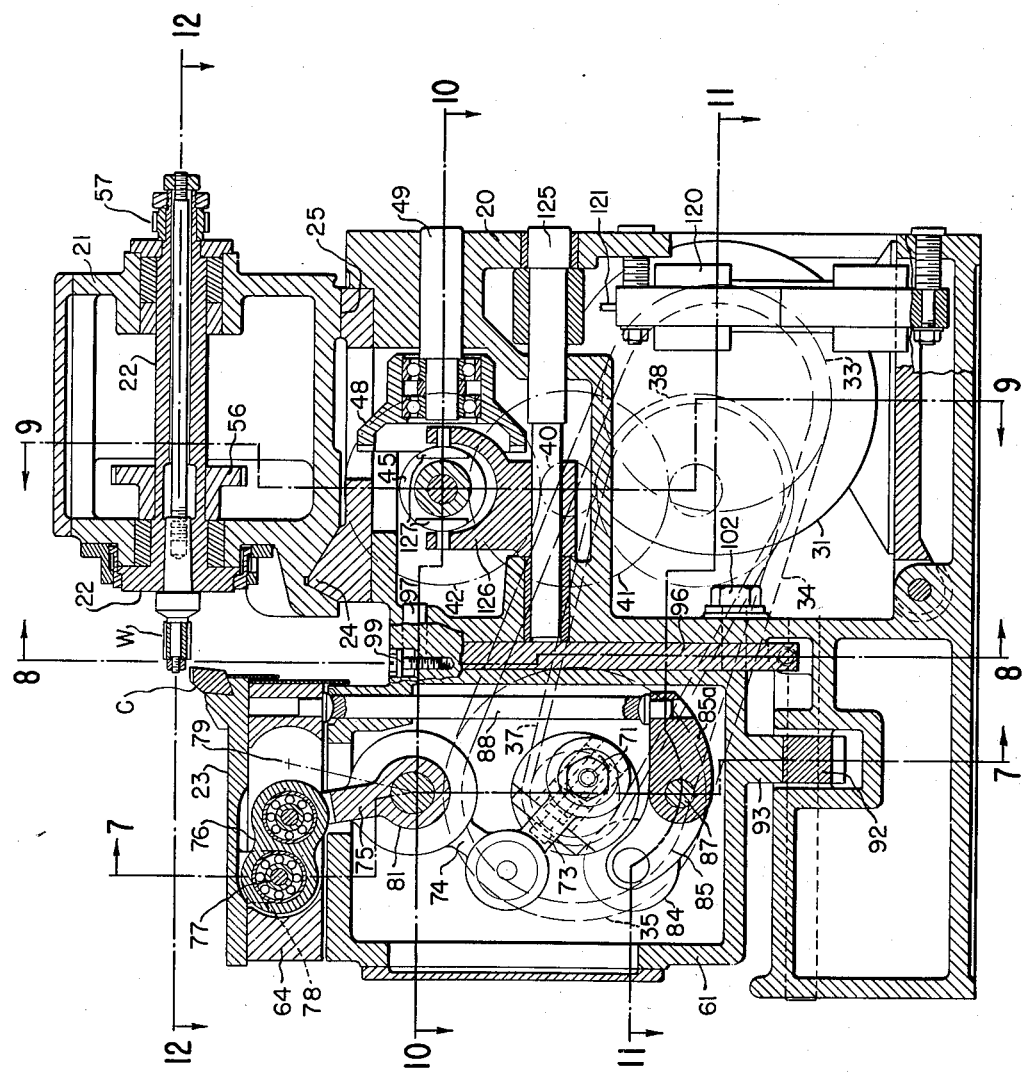
Fig. 6 is a vertical section of the machine from front to rear taken on line 6—6 of Figs. 5, 9, 10 and 11.
Figure 7:
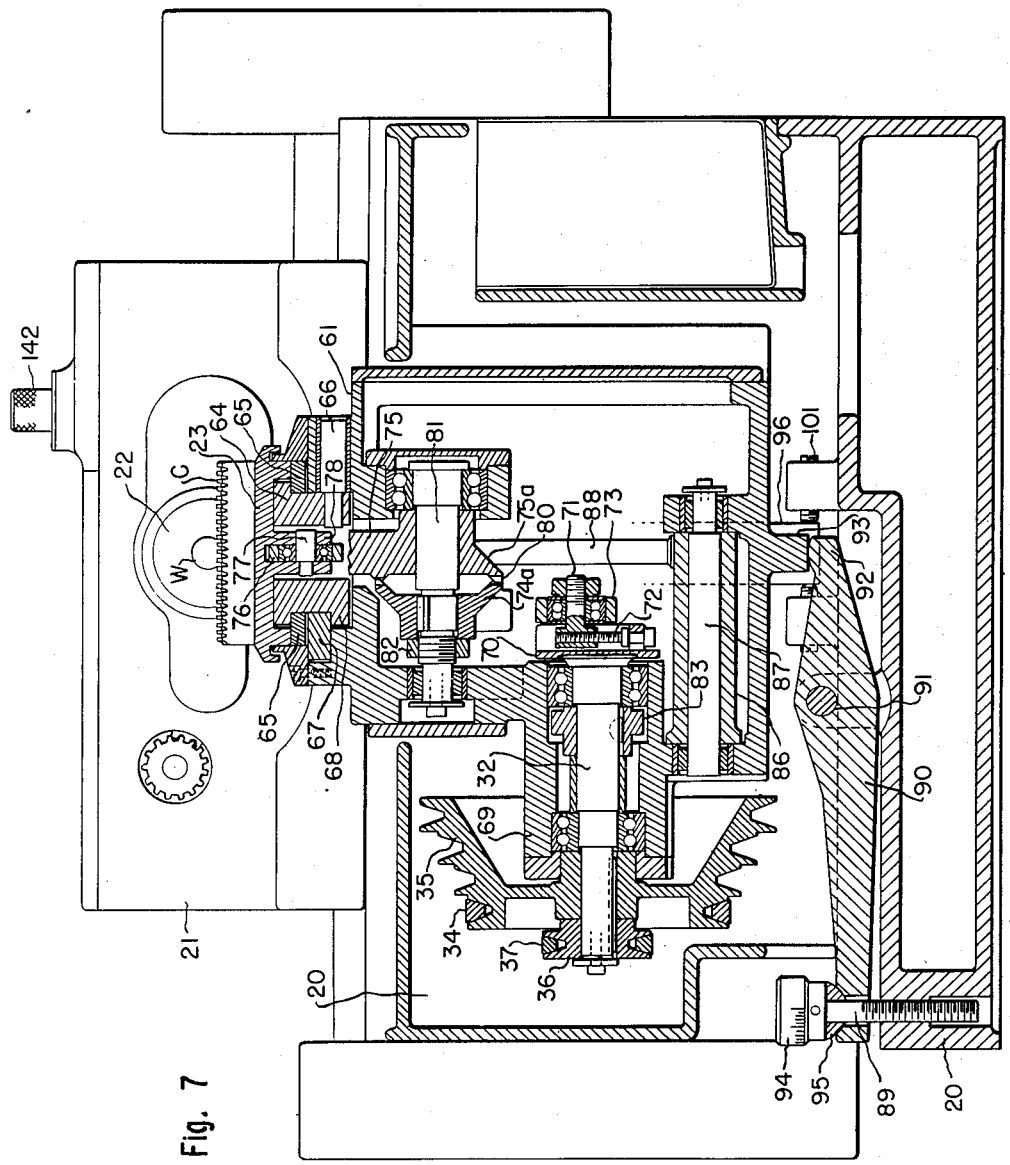
Figure 8:
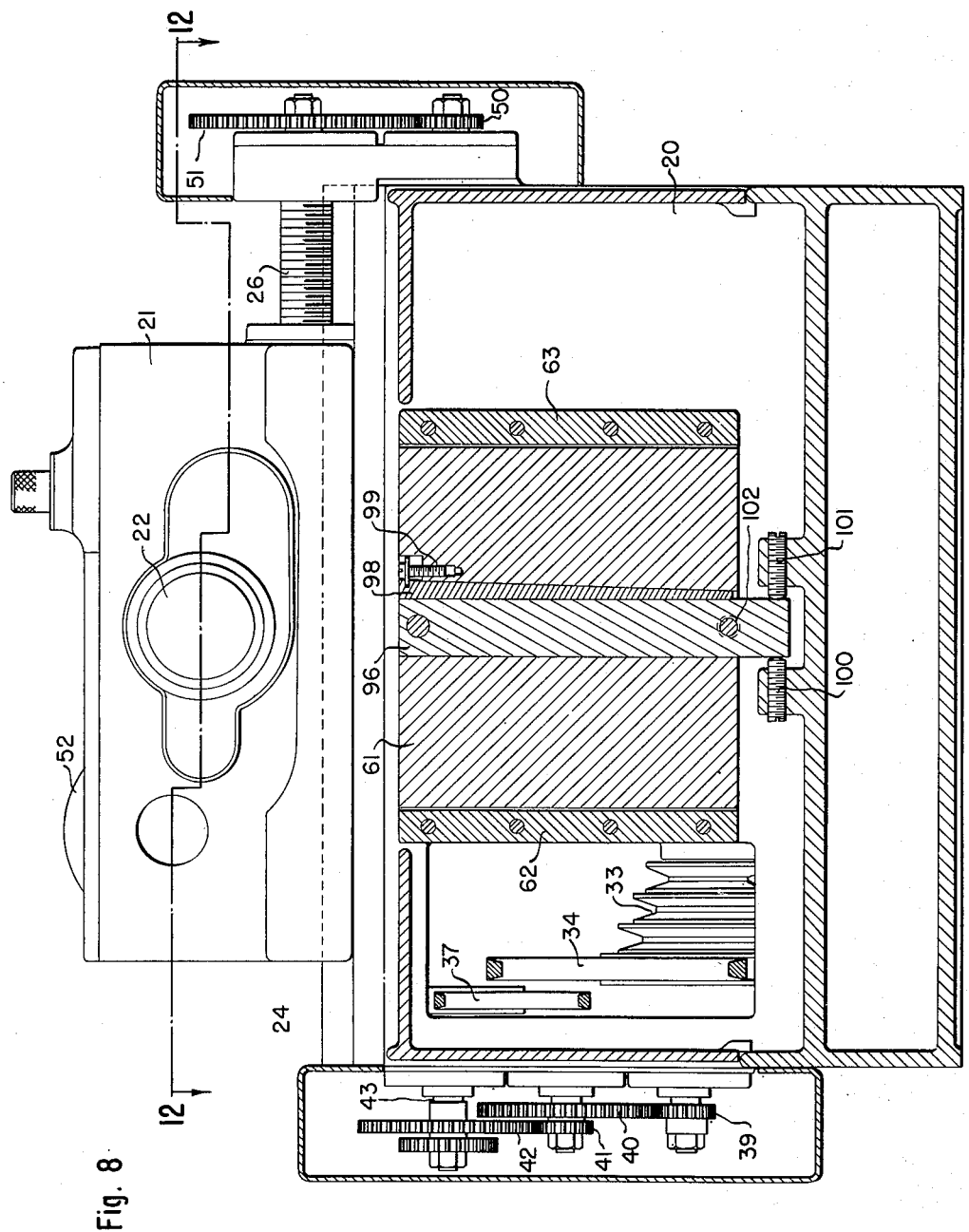
Figure 9:
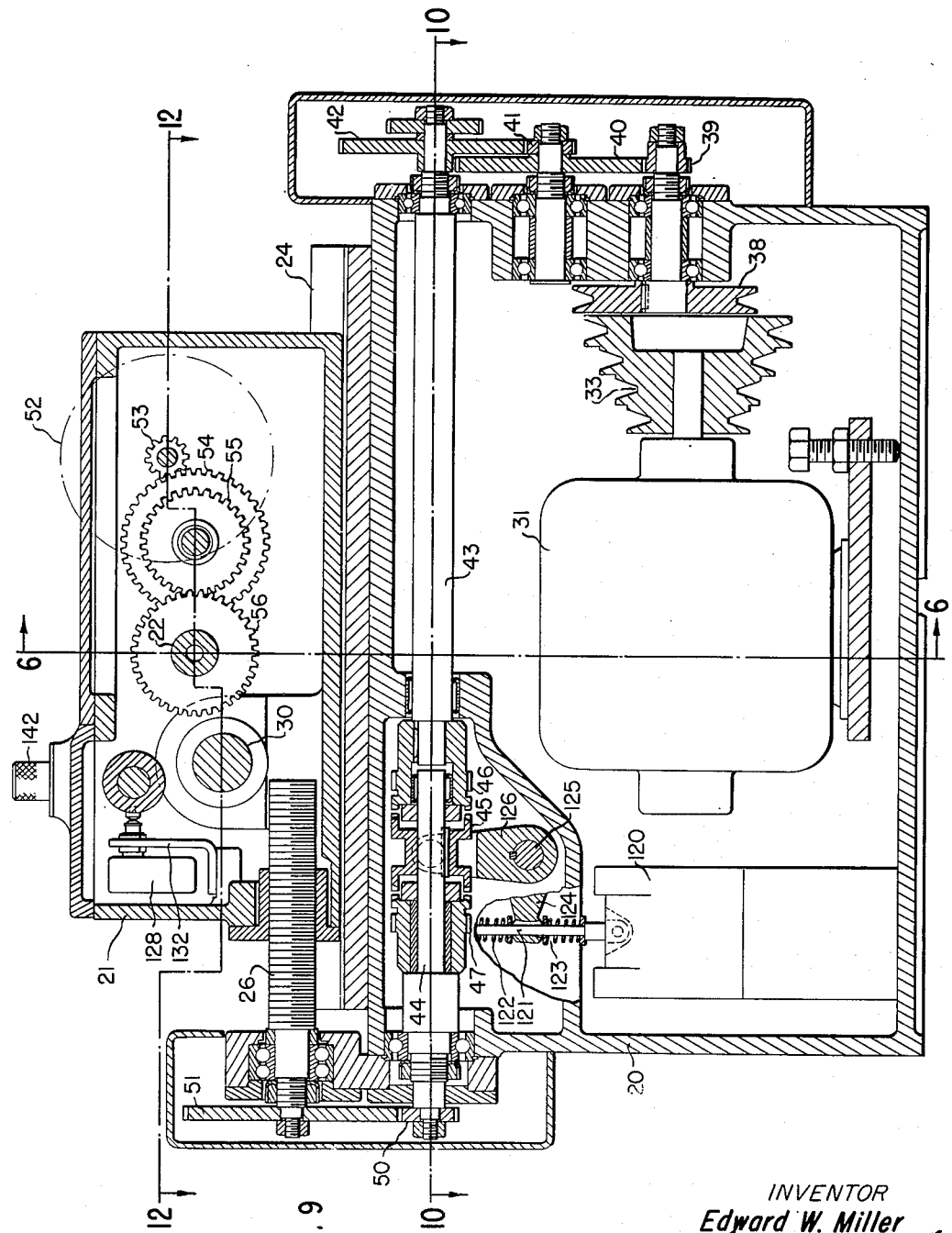
Figure 10:
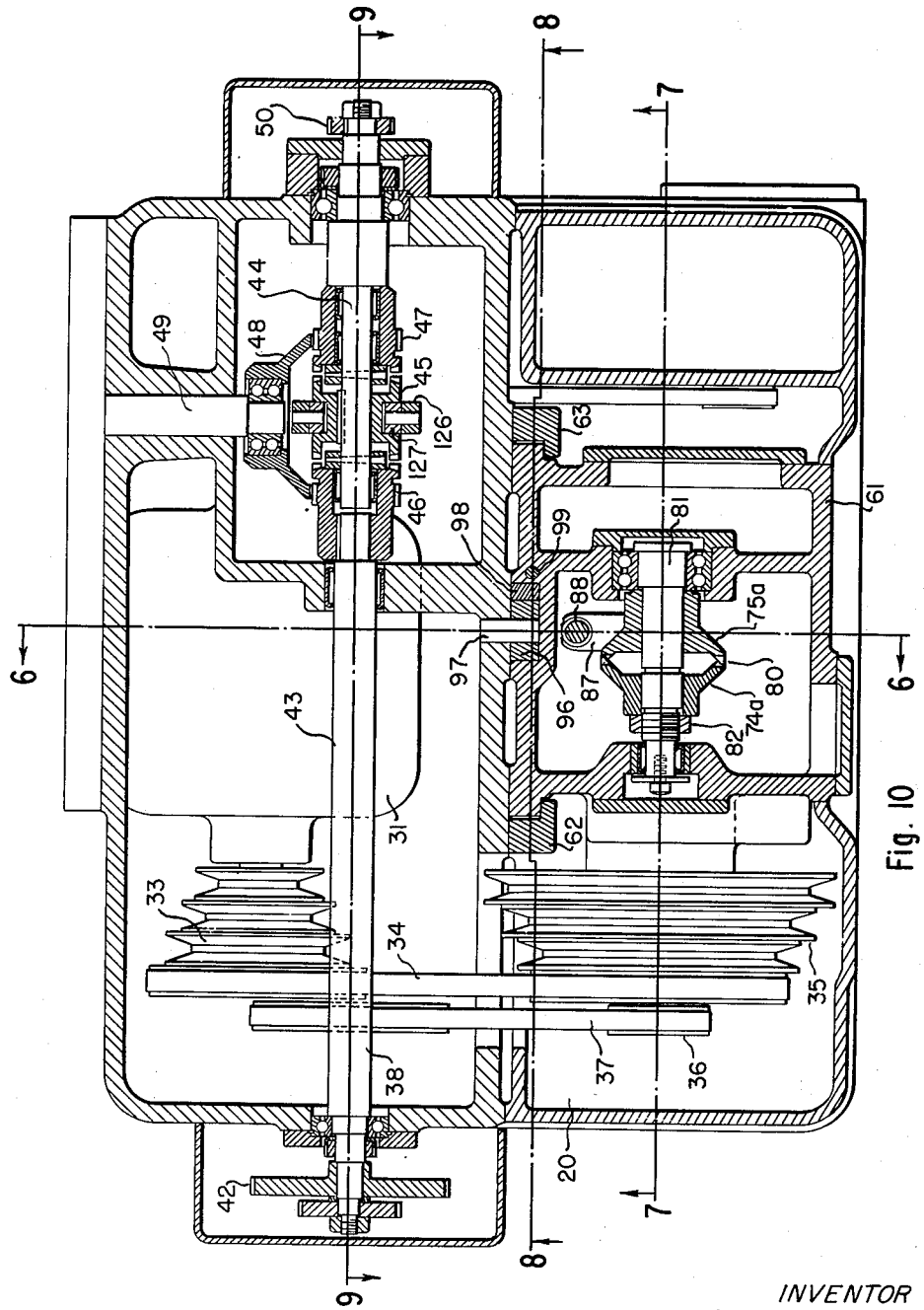
Figure 11:
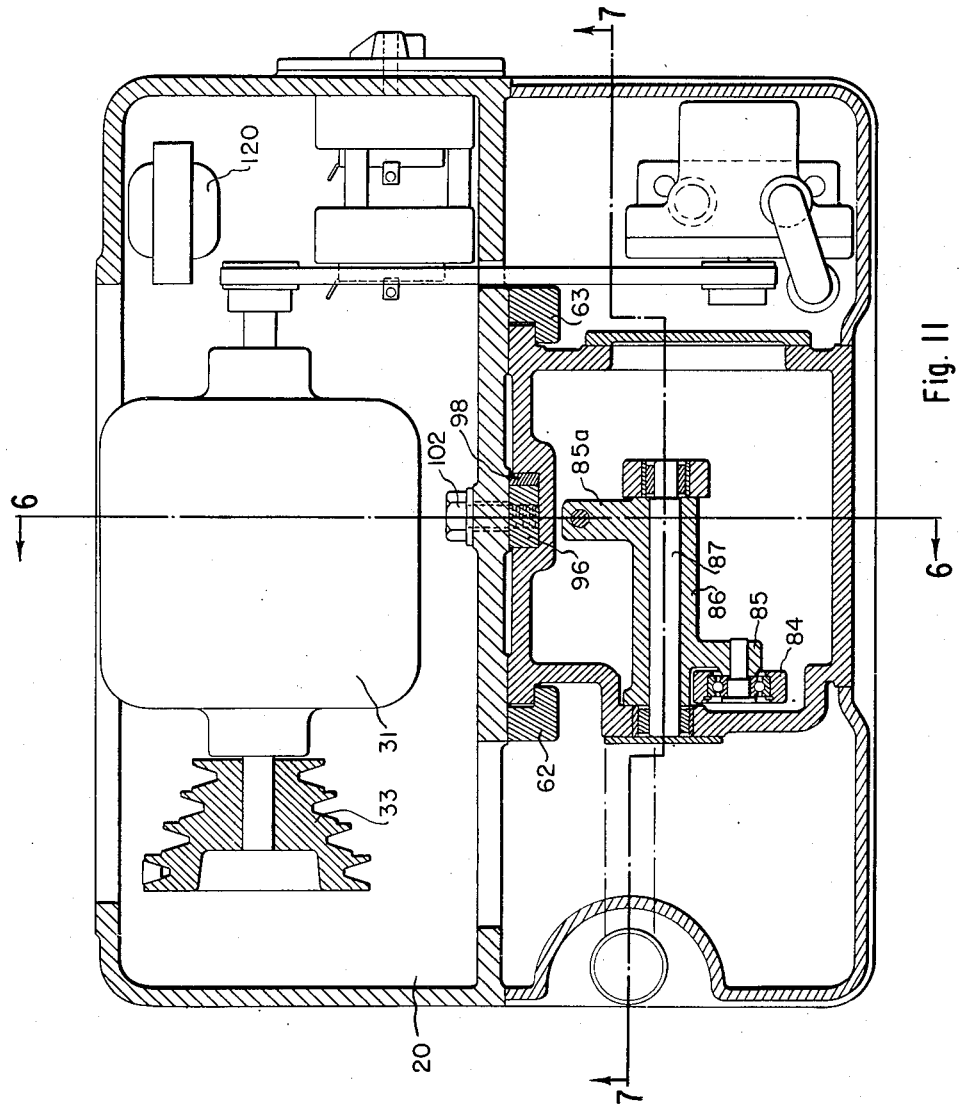
Figure 17:
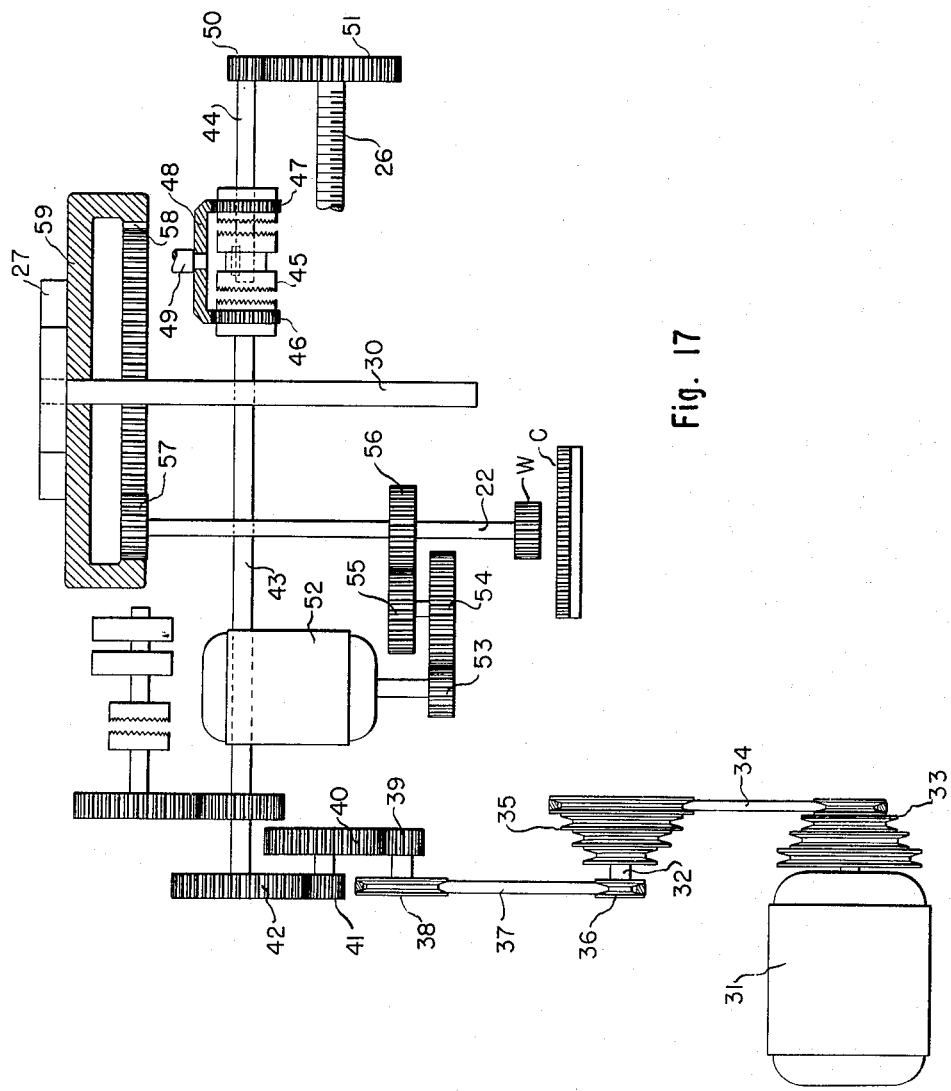

Figs. 7, 8 and 9 are vertical sections taken approximately on lines 7—7, 8—8 and 9—9, respectively, of Figs. 5, 6, 10 and 11;

Figs. 10, 11 and 12 are horizontal sections taken on lines 10—10, 11—11 and 12—12, respectively, of Figs. 6 and 9;

Fig. 13 is a vertical section taken on line 13—13 of Fig. 12;

Fig. 14 is a detail cross section taken on line 14—14 of Fig. 12;

Fig. 15 is a cross section taken on line 15—15 of Fig. 4 and Fig. 16;

Fig. 16 is a horizontal sectional plan on line 16—16 of Fig. 15;

Fig. 17 is a schematic diagram or layout of the driving means by which the work is reciprocated and rotated.

Referring first to Figs. 1–6 inclusive and 17, for a comprehensive view of the machine; the base 20 of the machine, of which only the upper part is shown in the drawings, supports a work carriage 21 in which a work spindle 22 is mounted; and a cutter carrying ram 23 to which a cutter C is secured. A work piece W, which is the cylindrical blank of a gear or pinion, is secured to the work spindle.

The work carriage 21 rests on guideways 24 and 25 on top of the base, by which it is constrained to move horizontally in a straight path. It is reciprocated in that path by a reversible screw 26 and the work spindle is rotated at the same time at a rate which causes the work piece to roll, without slip, on an imaginary horizontal plane tangent at the under side of the work piece to a prescribed pitch circle or cylinder, by means of a cam or former 27 in cooperation with abutments 28 and 29. The former is secured to a shaft 30 mounted on the work carriage 21, and the abutments are mounted on the machine base.

A schematic view of the driving mechanism by which the screw 26 and shaft 30 are rotated in opposite directions alternately is shown in Fig. 17. An electric motor 31, which may be called the main motor, drives a shaft 32 by means of a step pulley 33, belt 34 and step pulley 35 on shaft 32. This latter shaft actuates the cutter ram by means later described. It carries also a pulley 36 which, through a belt 37, pulley 38 and changeable gears 39, 40, 41 and 42, drives a shaft 43. A shaft 44 is mounted in alinement with shaft 43 and supports, in splined connection with it, a clutch 45 movable axially into engagement either with a clutch element carried by a gear 46, which is keyed to shaft 43, or with a clutch element carried by a gear 47 which rotates freely on shaft 44. Gears 46 and 47 are meshed with an intermediate face gear 48 rotatable on a stud shaft 49 perpendicular to the alined shafts 43 and 44, whereby gear 47 is driven from gear 46 but in the opposite direction. A gear 50 on shaft 44 meshes with a gear 51 on the screw 26. These last named gears are interchangeable with others of different ratios. Means later described are provided for shifting the clutch 45 into and out of connection with the gears 46 and 47 alternately.

An electric torque motor 52, mounted on carriage 21, is coupled with the work spindle 22 by a gear train 53, 54, 55 and 56, of which the last gear is keyed to the spindle. A pinion 57, also keyed to the spindle, meshes with an internal gear 58 secured to a disk or hub 59 which is secured to shaft 30 and to which the former 27 is secured.

The cutter C has along one of its sides a row or series of teeth similar to those of a rack except that they are finished at one end to provide cutting edges at the intersections of their end faces with their top and side faces, and the latter faces are convergently inclined sufficiently to provide cutting clearance. This cutter is mounted on the ram 23 with its main body part below the before mentioned imaginary horizontal plane, which may be called the rolling plane of the work, and the sides of its teeth extending more or less across that plane. This rolling plane is likewise the pitch plane of the cutter, when the cutter is considered as a rack to which the finished work gear is conjugate.

The cutter carrying ram 23 is mounted and guided to reciprocate in a path parallel to the plane above referred to and perpendicular to the path in which the work carriage reciprocates. As the work spindle is mounted with its axis parallel to the rolling plane and perpendicular to the carriage path, the directions in which the cutter reciprocates and the axis of the work are parallel.

The structure and means for supporting and reciprocating the cutter ram 23, holding the cutter C in one path while cutting and backing it off for its return strokes, and adjusting the position and length of the cutter path for work pieces of different dimensions, are shown in Figs. 6, 7, 8, 10 and 11. A vertical ram-supporting slide 61 of box formation is mounted on the forward side of the machine base by gibs 62 and 63 in which it can slide vertically (Figs. 8 and 11). It supports a guide block 64 having a top supporting surface on which the ram 23 rests and undercut sides which are engaged by gibs 65 secured to the ram. The guide block 64 is coupled to slide 61 by alined pivots 66 at its opposite sides. These pivots are located near the forward end (i. e., the end remote from the cutter) of the block. One of them is shown in Fig. 7, the other being omitted because the section of the left hand side of the block is taken near its rear end to show a stop 67. The axis of pivots 66 is parallel to the length dimension of the cutter and perpendicular to the path in which the ram travels, thus permitting the cutter to be raised and lowered. The stop 67 previously mentioned is secured to the slide 61 and overlies a flange 68 on the block, thus limiting the extent to which the rear end of the block can be raised.

Shaft 32, previously described as driven by the main motor 31 by a belt drive, is rotatably mounted in a bearing holder 69 forming part of the slide 61. It has a diametrically slotted crank disk 70 at its inner end, in the slot or guideway of which a crank pin 71 is adjustable radially by a screw 72. A link 73 couples crank pin 71 with one arm 74 of a bell crank lever, the second arm 75 of which is coupled by a connecting link 76 with a pivot 77 (Figs. 6 and 7) secured in lugs 78 which depend from the under side of ram 23. Block 64 is made with an internal cavity 79 between its sides and ends into which the lever arm 75 and lugs 78 project from bottom and top, respectively, and in which the link 76 and connecting pivots are contained. The bell crank arms are separate members and have hub portions 74a and 75a (Fig. 7) provided with mating clutch teeth 80. Arm 74 is splined on a shaft 81, which is mounted rotatably in bearings carried by slide 61, and arm 75 is rotatable about the shaft. A nut 82 on the shaft normally holds the clutch teeth in engagement and can be backed off to permit disengagement and angular adjustment of one arm relative to the other.

By adjustment of the crank pin 71 radially of the crank shaft, the length of stroke of the ram can be varied to correspond with work pieces of greater or less length, and by the angular relative adjustment of the lever arms 74 and 75, the limits of the cutter stroke can be varied according to the location of the portion of the work piece in which teeth are to be cut.

Backing off and return movements of the cutter are controlled by a cam 83 (Fig. 7) on the crank shaft 32 acting through a follower roll 84 (Fig. 6) carried by an arm 85 which projects from a sleeve 86 rotatable on a pivot shaft 87 held by the slide 61. Sleeve 86 carries a second arm 85a which projects rearwardly under the rear end of the ram-carrying block 64. A push rod 88 extends between arm 85a and the block. Thereby the high part of cam 83 causes the block to be raised about its pivot 66 until its bears against the stop 67, thereby placing the cutter in its working path, and the low part of the cam allows the block to descend under the force of gravity. These high and low parts are suitably disposed with respect to the crank pin 71 to hold the cutter in its working path throughout its cutting strokes and permit it to travel in a withdrawn path, clear of the work, during its return strokes.

All of the mechanisms last described are contained within and supported by the slide 61. This slide is adjustable vertically to accommodate the cutter to work pieces of larger or smaller diameter, and it is so adjusted by a screw 89 (Fig. 7) mounted in the base, through a lever 90 pivoted at 91 on the base and having an arm 92 which underlies and supports a projection 93 on the under side of the slide. Screw 89 has a head 94 carrying graduations by which the adjustments are measured, and it bears on the lever 90 by means of a spherical washer 95 occupying a spherical seat in the upper side of the lever.

Slide 61 is guided in its adjustments by means of a bar 96 (Fig. 8), which is coupled at its upper end by a pivot pin 97 (Fig. 6) with the base. Its opposite side edges are parallel and it is contained, together with a tapered key 98, in a guideway in the rear side of slide 61. The key is located between one side edge of bar 96 and the adjacent inclined wall of the guideway (the opposite side wall of the guideway and the side of the key next to the bar being straight and parallel) and can be adjusted endwise to take up sidewise looseness by a screw 99 seated in the slide and having a flange entering a notch in the adjacent side of the key. When adjusted to any desired position, the slide is rigidly secured by tightening the gibs 62 and 63 (which are connected with the base by screws shown in Fig. 8) whereby the screw 89 is relieved of reactive stresses occasioned by the operation of the machine.

The guide bar 96 is confined at its lower end between adjusting screws 100 and 101 mounted in threaded lugs in the base, by manipulation of which the bar can be brought exactly vertical and the pitch line of the cutter exactly horizontal. Stated in more general terms, this adjustment enables the pitch line of the cutter to be brought into exact coincidence with the rolling plane previously defined tangent to the pitch circumference of the work piece, since the guideways for the work carriage are horizontal and the axis of pivot 97 is also horizontal but perpendicular to the directions in which the guideways and the length of the cutter extend. Enough space is left between the embracing surfaces of the gibs 62, 63 and the parts of the slide which are embraced thereby to permit the required range of such adjustment. A clamp screw 102 (Figs. 6 and 8) threaded into the guide bar 96 through a slot in the contiguous wall of the base structure supplements the adjusting screws in holding the bar fast.

Referring to Figs. 3, 4, 15 and 16, it will be seen that the former 27 is secured to the hub member 59 by screws 103 and a dowel 104 which permit substitution of other formers having different dimensions. The abutments 28 and 29 are adjustable to accommodate such different formers, both tangentially of the abutting surfaces and transversely thereto. Abutment 28 is contained in an angular guideway 105, which extends parallel to the engaging face of the abutment, in a bracket 106 and can be secured at any point along such guideway by a clamp screw 107. Abutment 29 is similarly secured adjustably in a bracket 108 at the other side of the former. These brackets are pivotally connected at 109 and 110, respectively, with blocks 111 which occupy slidingly an undercut guideway 112 at the rear side of the machine base, such guideway being parallel to the path in which the work carriage reciprocates. Adjusting screws 113 and 114 are mounted in stationary bearings secured to the base and pass in threaded engagement through the blocks 111, whereby to adjust the brackets toward and away from the location of the former. Each bracket is provided with a lug 116 through which an adjusting screw 117 passes to bear on a bar or ledge 118, which is secured to the base. By the screws 117 the brackets are adjusted about their pivots 109 and 110 to incline the abutments at the correct pressure angle with respect to the former for imparting the required rotational component to the work spindle when the work carriage is reciprocated. Clamp screws 119 pass through slots in the brackets into threaded engagement with the base to secure the brackets in their various adjustments, such slots being long and wide enough to permit a desired range of adjustment, angularly as well as translatively.

It may be noted here that the former 27 has opposite contact faces of curvature corresponding to that of a gear tooth and the abutments have contact faces corresponding to those of rack teeth, wherefore the former is related to the abutments in the same manner as the tooth of a gear with flanking teeth of a rack when in mesh with such teeth. There may or may not be backlash between the former and the abutments according to the adjustment of the abutments. If it be assumed that the torque motor 52 is activated to impart counter-clockwise rotation to the shaft 30 (with reference to Fig. 4), while the carriage 21 is moved from right to left, then the former will bear on the abutment 28, and its rotation will be limited by that abutment to whatever rate is permitted by the travel of the carriage. This rate can be varied within limits, according to the principles of gearing, by angular adjustment of the abutment; and the adjustment is made such that the work will rotate in a non slip pitch line relationship with the rolling plane previously described. Substitution of different formers for one another, together with such adjustments of the abutments, enables the correct rates of rotation to be transmitted to work pieces of a wide range of diameters.

Reversals of the propelling screw 26 and torque motor 52 are effected by electrical means under control of the shaft 30. For thus reversing the screw, a double acting solenoid 120 is provided having a core which is coupled through a rod 121 (Figs. 6 and 9) and springs 122 and 123 with an arm 124 secured to a rock shaft 125. The rock shaft carries a second arm 126 which is forked to embrace the sliding clutch 45 and carries shoes 127 occupying an encircling groove in the circumference of the clutch.

Limit switches 128, 129, 130 and 131 (Fig. 16) are mounted on a bracket 132 (Fig. 13) in the carriage. They are suitably connected electrically with the reversing circuits of the solenoid 120 and motor 52 and each has a plunger 133 which, when pushed inward, actuates it. A shaft 134 mounted rotatably parallel to the row in which the plungers 133 are arranged supports a number of studs 135 each rotating in a plane which includes one of the plungers 133. A gear 136 secured to shaft 30 meshes with a gear segment 137 secured to shaft 134, rotating the latter when shaft 30 is turned. When, during rotation of shaft 134, any of the studs 135 comes into line with the corresponding plunger 133, it actuates the switch with which the plunger is associated.

Two of the studs 135 are carried by a sleeve 138 rotatable about the shaft 134, and the other studs are carried by a sleeve 139 also rotatable about the shaft. Sleeve 138 carries a face gear 140 meshing with a pinion 141 with which a knob 142 is connected; and sleeve 139 carries a similar face gear 143 meshing with a pinion 144 to which a knob 145 is connected. These knobs project from the top wall of the work carriage and are rotatable manually to adjust the sleeves and the angular relationship of the studs around shaft 134. The sleeves 138 and 139, when adjusted, are located in place by means of friction keys 146 (Figs. 13 and 15), which are located in radial slots of the shaft and are forced outward by tapered pilot screws 147 which are threaded coaxially into opposite ends of shaft 134. The studs 135 carried by either sleeve may be in the same radial plane of shaft 134 or in different radial planes, as desired. Although Fig. 16 shows them all in the same plane, this is for illustration only and does not show their relative positions when the machine is in operation. At such times the studs of one sleeve are more or less displaced around the axis of the shaft from those of the other sleeve, according to the distance prescribed for the travel of the carriage.

The manner in which the limit switches are connected with the solenoid 120 and torque motor 52 is not a feature of the invention, and they may be connected in any manner desired by the electrician, provided only the circuits are so arranged that the studs carried by one sleeve will cause the solenoid and motor to be reversed when shaft 30 has been rotated through a prescribed angle in one direction, and the studs of the other sleeve will cause reversal when the shaft has turned in the other direction through a prescribed angle. The linear distance through which the work carriage travels is directly proportional to the angle of rotation of the shaft.

The speed of travel of the work carriage is governed by the speed of the main motor 31, the ratio of the steps of the pulleys 33 and 35 on which the belt 34 is mounted, and the value of the changeable gear trains 39—42 and 50—51. With any given set of change gears in these trains, the speed of the carriage is in the same ratio to the rate of reciprocation of the cutter ram, whatever may be the driving ratio from the main motor to the crank shaft 32. As both gear trains are speed reducing trains, and the carriage is propelled by a screw (screw 26), which may have a thread of short lead, the rate of travel of the carriage is very slow in proportion to that of the cutter.

An important feature of the machine is that the rotation of the work, which may turn through a complete revolution, or more than one, during a single traverse of the carriage, is controlled by a former and abutments. Rotation of the work through so large an angle while the former turns through a practicable arc of action with the abutments is made possible by the gear ratio of the pinion 57 and internal gear 58. In the present illustration this ratio happens to be one to six, whereby the work can rotate 360° while the former rotates 60°. This ratio, however, is by no means a limiting one and any other practicable ratio may be selected. The internal gear is detachably secured to hub 59, as is shown by Figs. 4 and 12, being secured thereto by screws 150, and pinion 57 is detachably secured to the work spindle by a key and a nut 151 and is accessible for removal and replacement through an arcuate slot in the hub. Thus pinion and gear couples of other ratios may be substituted for that here shown.

As torque is applied by the motor 52 to the work spindle, and by the latter to the former through the reducing gears 57, 58, no racking stresses are applied to the gears, shafts, or bearings. The function of the former and abutments is to limit rotation of the work spindle to the degree permitted by movement of the carriage, not to impart rotation in consequence of such movement, or to propel the carriage by mutual action and reaction. Instead, the carriage is propelled by a positively driven screw 26 and the work spindle is rotated by a motor at a rate in prescribed ratio to the rate of carriage travel.

By employing a former and abutments to control the angular component of rolling movement of the work, it is unnecessary to make the screw with great precision and accuracy or absence of backlash. The necessary accuracy and precision of rolling movement is provided by the former and abutments and the adjustments which can be given to the abutments.

No indexing of the work is required, for in any instance a cutter is used of which the length and number of teeth are as great as the length of the pitch arc and the number of teeth to be cut in the work; or preferably somewhat greater in order to insure finishing with a desirable quality of finish of all the teeth of the work piece. The cutting action is accomplished equally well during rolling traverse of the work in both directions, and the work may either be changed at the end of each traverse, or may be returned after making a first traverse in order that a second and finishing cut may be taken. To facilitate changing of the work, the limit switches previously mentioned may be connected in circuit with the main motor and its starting switch so as to stop that motor at the end of each traverse of the carriage, or at the end of every alternate traverse or other desired number of successive traverses.

The statements before made regarding complete rotation of the work are not to be construed as implying that only complete gears can be generated by this machine. Gear segments of any angular extent can equally well be generated.

Neither is it to be assumed that the driving power for the machine is necessarily electrical. On the contrary, hydraulic or mechanical, or various combinations of electrical, hydraulic and/or mechanical driving powers may be employed.

Various modifications in the structure and arrangement of the machine as a whole, and of its several parts and sub-combinations may be made within the scope of the protection herein claimed.

What I claim is:

1. A machine for generating gears comprising a rack type cutter with cutting edges on the ends of its teeth, means for reciprocating said cutter transversely of its length and in the direction of the length of its teeth, a work carriage movable translatively in a path parallel to the length dimension of the cutter, a work spindle fixed against transverse movement relative to said carriage and mounted rotatably in said carriage with its axis parallel to the directions in which the cutter is reciprocated, arranged to support a gear blank in rolling mesh relationship with the cutter, means for moving the carriage in its prescribed path, means for imparting rotation to the spindle, a former mounted on the carriage to rotate about an axis parallel to that of the spindle, reducing gearing between the spindle and former whereby torque is transmitted from the spindle to the former and the former is rotated at a fraction of the rotation of the spindle, and a stationary abutment against which the former is held by such torque application and by which the angular movement of the spindle is correlated with linear movement of the carriage.

2. In a machine of the character and for the purpose set forth, the combination of a supporting structure, a carriage mounted for linear movement on said supporting structure, a work spindle fixed against any transverse movement relative to said carriage and a former mounted on said carriage in stationary locations thereon to rotate about parallel axes, means for rotating the spindle, gearing between said spindle and former arranged to transmit rotation from the spindle to the former having a ratio which allows rotation of the spindle through a larger angle than the angle of rotation of the former, and an abutment on the supporting structure in a relation to the former like that of a rack tooth to a mating gear tooth for correlating the angular movement of the spindle to that of the carriage.

3. A machine for generating gear teeth comprising a cutter of rack form having cutting edges at the ends of its teeth, means for reciprocating said cutter in directions to cause advance of its teeth, cutting end first, and retraction, and means for causing a gear blank to be rolled lengthwise of the cutter in the manner of a gear rolling along a mating rack, with its periphery in position to be incised by the cutter teeth during advancing travel thereof, said last named means comprising a carriage, a work spindle fixed against any transverse movement relative to said carriage and rotatably mounted on said carriage and adapted to hold a gear blank in the prescribed relation to the cutter, mechanism for moving the carriage in a path parallel to the length of the cutter, a former rotatably mounted on the carrier, a stationary abutment having a contact face in contact with a side face of the former, the abutment and former having an interrelation like that of a rack tooth with a mating gear tooth, and gearing between the former and work spindle arranged to transmit torque and rotation from the spindle to the former, having a ratio such that the spindle is caused to make at least one complete rotation while the former rotates within the limits of its effective arc of action with the abutment.

4. In a gear generating machine, the combination with a supporting structure, of a work carriage mounted to travel in a rectilinear path on said structure, a former carried rotatably by the carriage, an abutment mounted on the supporting structure, said former and abutment being interrelated in the same manner as a gear tooth and a mating rack tooth, means for propelling the carriage in its prescribed path, the former being constrained by the abutment to rotate at a rate proportional to the linear travel of the carriage, a work spindle fixed against any transverse movement relative to said carriage and rotatably mounted on the carriage, and torque transmitting gearing between the former and spindle having a ratio other than unity.

5. The combination set forth in claim 4, in which the ratio of the gearing between the former and spindle is such that the spindle is enabled to turn through a complete rotation while the former turns through a small fraction of a rotation.

6. In a gear generating machine, the combination with a supporting structure, of a work carriage mounted to travel in a rectilinear path on said structure, a former carried rotatably by the carriage, an abutment mounted on the supporting structure, said former and abutment being interrelated in the same manner as a gear tooth and a mating rack tooth, means for propelling the carriage in its prescribed path, a work spindle fixed against any transverse movement relative to said carriage and rotatably mounted on the carriage, torque applying means on the carriage coupled with the spindle tending to rotate it, and gearing between the spindle and former arranged to transmit torque to the former in the direction to hold it against the abutment, and to rotate the former in fractional ratio to the rotation of the spindle.

7. In a machine of the character described, a supporting structure, a carriage movable back and forth in a fixed path on said supporting structure, reversible driving mechanism connected to propel the carriage in opposite directions alternately, a former having characteristics analogous to those of a gear tooth mounted rotatably on the carriage, abutments on the supporting structure embracing said former in a relation similar to that between mating teeth of a rack and gear, a spindle fixed against any transverse movement relative to said carriage and rotatably mounted on the carriage in geared connection with the former such as to rotate simultaneously with the former through an angle which is a relatively large multiple of the angle through which the former rotates, reversible motive means connected to apply torque to the spindle and former, and means controlled by rotation of the former for reversing said means and the carriage-propelling mechanism.

8. In a machine of the character described, a supporting structure, a carriage movable on said supporting structure, reversible propelling mechanism for moving the carriage back and forth, a rotatable machine element on the carriage, a second element on said carriage to actuate said rotatable machine element and movable in response to movement of the carriage, means connecting said rotatable element with said second element, and means controlled by said machine element for reversing said propelling mechanism.

9. In a machine of the character described, a supporting structure, a carriage movable on said supporting structure, reversible propelling mechanism for moving the carriage back and forth, a rotatable machine element on the carriage, motive means on the carriage connected with said machine element for rotating it, said motive means being actuated in response to movement of said carriage and means controlled by the machine element in its rotation for reversing both said propelling mechanism and said motive means.

10. In a machine of the character described, a supporting structure, a work supporting carriage mounted on said supporting structure, an adjustable slide connected with said supporting structure, a cutter of rack form mounted on said slide in cutting position with respect to said work carriage, a guide bar mounted on the supporting structure engaged with the slide for controlling its path of adjustment, and means for adjusting the guide bar angularly on the supporting structure so as to properly align said cutter with a work piece held on said work support.

11. A gear generating machine comprising a supporting structure, a work carriage reciprocable on said supporting structure in a prescribed path, a work spindle on the carriage rotatably mounted with its axis perpendicular to said path, a slide connected with the supporting structure, a reciprocable cutter carrying ram mounted on the slide for movement toward and away from the carriage, a cutter of rack form mounted on the ram having its length dimension substantially parallel with the path of the carriage, and a guide bar on the supporting structure extending transversely to the paths of the carriage and ram and to the cutter spindle, the slide being engaged with the guide bar for guided adjustment toward and away from the work spindle, the bar itself being angularly adjustable about an axis parallel to the work spindle to correct for lack of parallelism between the length dimension of the cutter and the path in which the spindle is moved by reciprocation of the carriage.

12. A gear generating machine comprising a work holder, means for rotating said holder and simultaneously translating it in a path transverse to its axis of rotation, the rate of rotation and translative movement being correlated to impart rolling movement to a work piece carried by the holder, a ram support, a cutter-carrying ram on said support, means for reciprocating said ram in a path extending lengthwise of said axis, a cutter of rack form having cutting edges on the ends of its teeth secured to the ram in a position to perform a cutting action on such a work piece in its reciprocating travel while the rolling movement of the work piece takes place, and means for adjusting the ram support about an axis parallel to the path in which the ram reciprocates so as to place the length dimension of the cutter parallel to the path of translative travel of the work holder.

13. In a machine of the character described, a supporting structure, a carriage movable on said structure, a reversible screw engaged with said carriage for propelling it back and forth, driving mechanism for the screw including two oppositely rotating machine elements and a clutch shiftable into mesh with either of said machine elements for coupling one or the other with the screw, a double acting solenoid coupled with the clutch element, switch means on the carriage in circuit connection with said solenoid, and switch shifting means on the carriage movable in time with the carriage arranged to actuate said switch shifting means for activating the solenoid at each end of the carriage stroke, whereby to shift the clutch alternately into coupled relation with one or the other of said machine elements.

14. In a machine of the character described, a supporting structure, a carriage mounted on said structure for back and forth movement, a work spindle rotatably mounted on the carriage, a reversible electric motor mounted on the carriage, a former rotatably mounted on the carriage and coupled with the motor to be rotated thereby, abutments on the supporting structure cooperatively associated with the former to control the angular movements of the work spindle, and switching means in circuit with said motor and operatively coupled with the former to reverse the motor when the former has been turned through a prescribed angle in each direction.

15. In a machine of the character described, a supporting structure, a carriage mounted on said structure with provisions for linear movement in opposite directions, a work spindle rotatably mounted on the carriage, a reversible screw coupled with the carriage for moving it back and forth, a rotatable former on the carriage, a reversible electric motor on the carriage coupled with said former for rotating it, abutments on the supporting structure associated with said former for controlling the rotation of the spindle, driving mechanism for the screw including a reversing gear whereby the screw may be rotated in opposite directions, a double acting solenoid coupled with said reversing gear for shifting the latter when the solenoid is activated in one direction or the opposite direction, and switching means in circuit with the motor and solenoid and in driven connection with the former arranged to activate the solenoid and reverse the current flow to the motor when the former has turned through a predetermined angle in opposite directions.

16. In a gear generating machine, a supporting structure, a work carriage reciprocable on said structure, a work spindle rotatable on the carriage about an axis transverse to the path of the carriage, a cutter carrying ram, a guide block reciprocable toward and away from the carriage in a path parallel with the spindle axis on which said ram is mounted, a cutter secured to said ram in position to perform a cutting action on work pieces carried by the work spindle when the ram is reciprocated, means for reciprocating said guide block comprising a driving crank, a lever having two arms, a connecting rod between one of said arms and the crank, and a link connected to the other arm of the lever and to the guide block, the arms of the lever being angularly shiftable one with respect to the other and having clutching means for securing them in different angular relationship, whereby to establish and alter the limits of the reciprocatory path of the guide block.

17. In a gear generating machine, the combination with a reciprocable work carriage and a rotatable work spindle mounted on the carriage with its axis of rotation transverse to the carriage path, of a guide block movable in a path parallel to the axis of the work spindle, a cutter carrying ram mounted on the guide block, a cutter of rack form mounted on the ram in position to perform cutting actions on a work piece mounted on the work spindle when the guide block is reciprocated, a structure on which said block is mounted, and to which it is pivotally connected at a distance from the location of the cutter on an axis parallel to the length of the cutter, a driving crank shaft rotatably mounted on said structure, a crank on the crank shaft, linkage coupled with the crank shaft and the guide block for moving the guide block back and forth when the crank is rotated, a cam on the crank shaft, a lever having two arms mounted on said structure, one of said arms being engaged with said cam, and the other arm extending under the portion of the guide block on which the cutter is mounted, and a push rod extending from the last named arm to the under side of the block disposed to transmit motion from the cam to the block.

EDWARD W. MILLER.

REFERENCES CITED

The following references are of record in the file of this patent:

UNITED STATES PATENTS

| Number | Name | Date |
|---|---|---|
| 905,084 | Lees | Nov. 24, 1908 |
| 946,161 | Spencer et al. | Jan. 11, 1910 |
| 1,405,909 | Edwards et al. | Feb. 7, 1922 |
| 1,858,468 | Simmons | May 17, 1932 |
| 2,136,266 | Reinecker | Nov. 8, 1938 |
| 2,202,766 | Trosch | May 28, 1940 |
| 2,356,869 | Miller | Aug. 29, 1944 |
| 2,368,061 | Wortendyke | Jan. 23, 1945 |
| 2,372,596 | Miller | Mar. 27, 1945 |
| 2,387,166 | Miller | Oct. 16, 1945 |
| 2,400,815 | Forman | May 21, 1946 |
| 2,404,561 | Bannow | July 23, 1946 |